United States Patent
Li et al.

(10) Patent No.: US 10,851,026 B2
(45) Date of Patent: Dec. 1, 2020

(54) IMPURITY BARRIER LAYER FOR CERAMIC MATRIX COMPOSITE SUBSTRATE

(71) Applicants: Rolls-Royce Corporation, Indianapolis, IN (US); Rolls-Royce High Temperature Composites, Inc., Cypress, CA (US)

(72) Inventors: Li Li, Carmel, IN (US); Sungbo Shim, Irvine, CA (US); Sunny Chang, Carmel, IN (US)

(73) Assignees: Rolls-Royce Corporation, Indianapolis, IN (US); Rolls-Royce High Temperature Composites, Inc., Cypress, CA (US)

( * ) Notice: Subject to any disclaimer, the term of this patent is extended or adjusted under 35 U.S.C. 154(b) by 0 days.

(21) Appl. No.: 16/014,660

(22) Filed: Jun. 21, 2018

(65) Prior Publication Data

US 2018/0370863 A1    Dec. 27, 2018

Related U.S. Application Data

(60) Provisional application No. 62/522,970, filed on Jun. 21, 2017.

(51) Int. Cl.
  *C23C 4/04*  (2006.01)
  *C23C 4/10*  (2016.01)
  (Continued)

(52) U.S. Cl.
  CPC ............ *C04B 41/52* (2013.01); *B01J 20/3078* (2013.01); *C23C 4/04* (2013.01); *C23C 4/10* (2013.01); *C23C 4/12* (2013.01); *C23C 28/042* (2013.01)

(58) Field of Classification Search
  CPC ...... C04B 41/52; C04B 41/522; C04B 41/524; C04B 41/526; C23C 4/04; C23C 4/10; C23C 4/134; C23C 4/126; C23C 4/18
  (Continued)

(56) References Cited

U.S. PATENT DOCUMENTS 3,499,837 A    3/1970   Jaunarajs
5,911,882 A    6/1999   Benjamin et al.
(Continued)

FOREIGN PATENT DOCUMENTS

EP    2767525 A1    8/2014
EP    2778250 A2    9/2014
(Continued)

OTHER PUBLICATIONS

Extended Search Report from counterpart European Application No. 18173414.6, dated Jan. 18, 2019, 13 pp.
(Continued)

*Primary Examiner* — Dah-Wei D. Yuan
*Assistant Examiner* — Nga Leung V Law
(74) *Attorney, Agent, or Firm* — Shumaker & Sieffert, P.A.

(57) ABSTRACT

A method of forming an impurity barrier layer on a CMC substrate may include introducing, to a heated plume of a thermal spray gun, a composite feedstock that includes a first coating material including a plurality of first particles; and a second coating material that may be different from the first coating material, where the second coating material at least partially encapsulates at least a portion of respective surfaces of the plurality of first particles; and directing, using the heated plume, at least the first coating material to a surface of a CMC substrate to deposit an impurity barrier layer including at least the first coating material.

7 Claims, 4 Drawing Sheets

(51) Int. Cl.
*C23C 4/12* (2016.01)
*C04B 41/52* (2006.01)
*C23C 28/04* (2006.01)
*B01J 20/30* (2006.01)

(58) Field of Classification Search
USPC ........ 427/446, 448, 450, 452, 454, 455, 456
See application file for complete search history.

(56) References Cited

U.S. PATENT DOCUMENTS

| | | | |
|---|---|---|---|
| 6,528,190 B1* | 3/2003 | Campbell | C04B 35/117 428/293.4 |
| 7,300,702 B2 | 11/2007 | Li et al. | |
| 8,206,792 B2 | 6/2012 | Gollob et al. | |
| 2012/0018384 A1 | 1/2012 | Sawyer | |
| 2014/0134452 A1 | 5/2014 | Sherman et al. | |
| 2015/0044444 A1 | 2/2015 | Gell et al. | |
| 2015/0307980 A1* | 10/2015 | Espallargas | C04B 35/62886 427/450 |
| 2016/0017749 A1* | 1/2016 | Luthra | C04B 41/89 428/332 |
| 2016/0068941 A1 | 3/2016 | Nair et al. | |
| 2016/0273089 A1 | 9/2016 | Strock | |
| 2016/0376691 A1 | 12/2016 | Wadley et al. | |

FOREIGN PATENT DOCUMENTS

| | | |
|---|---|---|
| EP | 2918698 A1 | 9/2015 |
| EP | 1999288 B1 | 9/2016 |
| EP | 3070073 A1 | 9/2016 |
| WO | 03004718 A2 | 1/2003 |
| WO | 2007108793 A1 | 9/2007 |
| WO | 2010/123612 A2 | 10/2010 |
| WO | 2013/188516 A1 | 12/2013 |
| WO | 2014/068082 A1 | 5/2014 |
| WO | 2018/033577 A1 | 2/2018 |

OTHER PUBLICATIONS

Fan et al., "Bond stability and oxidation resistance of BSAS-based coating on C/SiC composites", Surface & Coatings Technology 309 (2017) 35-46, Oct. 29, 2016, 12 pgs.

Mubarok et al., "Suspension Plasma Spraying of Sub-micron Silicon Carbide Composite Coatings", Journal of Thermal Spray Technology, vol. 24(5) Jun. 2015, 10 pgs.

Mubarok et al., "Synthesis of Thermal Spray Grade Silicon Carbide Feedstock Powder for Plasma Spray Deposition", ITSC 2015—Proceedings of the International Thermal Spray Conference, May 11-14, 2015, 6 pgs.

Wielage et al., "Development and investigation of SiC-based thermal spray powders with alumina-yttria binder matrix", International Thermal Spray Conference & Exposition, May 14-16, 2007, 1 pg., Abstract only provided.

Response to the Extended Search Report from counterpart European Application No. 18173414.6, dated Jan. 18, 2019, filed Aug. 9, 2019, 12 pp.

Response to Communication Pursuant to Article 94(3) EPC dated Mar. 26, 2020, filed Jun. 15, 2020, 57 pgs.

Communication pursuant to Article 94(3) EPC from counterpart EP Application No. 18173414.6 dated Mar. 26, 2020, 4 pgs.

* cited by examiner

IMPURITY BARRIER LAYER FOR CERAMIC MATRIX COMPOSITE SUBSTRATE

This application claims the benefit of U.S. Provisional Application No. 62/522,970, filed Jun. 21, 2017, which is incorporated herein by reference in its entirety.

TECHNICAL FIELD

The present disclosure generally relates to barrier layers and composite coating feedstocks for forming barrier layers on ceramic matrix composite substrates.

BACKGROUND

Ceramic matrix composite (CMC) substrates may be useful in a variety of contexts where mechanical and thermal properties are important, such as, for example, components in high temperature mechanical systems, including gas turbine engines. Some CMC substrates may be coated with an overlying layer to reduce exposure of the CMC substrate to radiant heat or elements and compounds present in the operating environment of high temperature mechanical systems.

SUMMARY

In some examples, the disclosure describes a method that includes introducing, to a heated plume of a thermal spray gun, a composite feedstock that includes a first coating material including a plurality of first particles; and a second coating material that may be different from the first coating material, in which the second coating material at least partially encapsulates respective surfaces of the plurality of first particles; and directing, using the heated plume, at least the first coating material to a surface of a ceramic matrix composite (CMC) substrate to deposit an impurity barrier layer that includes at least the first coating material.

In some examples, the disclosure describes a method for forming a composite feedstock for thermal spraying. The method may include combining a first coating material including a plurality of first particles and a second coating material that may be different from the first coating material and blending the first coating material and the second coating material. At least a portion of the second coating material adheres to a surface of at least some of the first particles to at least partially encapsulate the first coating material.

In some examples, the disclosure describes a method for forming a composite feedstock for thermal spraying that includes mixing a first coating material including a plurality of first particles and a precursor. The precursor at least partially encapsulates at least some of the plurality of first particles. The method also may include, after mixing, heat-treating the first coating material and the precursor at between about 450° C. and about 1400° C. to convert the precursor to a ceramic or a substantially pure metal that at least partially encapsulates at least some of the plurality of first particles.

In some examples, the disclosure describes an article that includes a ceramic matrix composite (CMC) substrate; at least a first coating material directly on a surface of the CMC substrate; a bond coat on a surface of the first coating material; and an overlying layer on the bond coat, where the first coating material reduces migration of an impurity from the CMC substrate into the overlying layer The details of one or more examples are set forth in the accompanying drawings and the description below. Other features, objects, and advantages will be apparent from the description and drawings, and from the claims.

DETAILED DESCRIPTION

Figure 1:
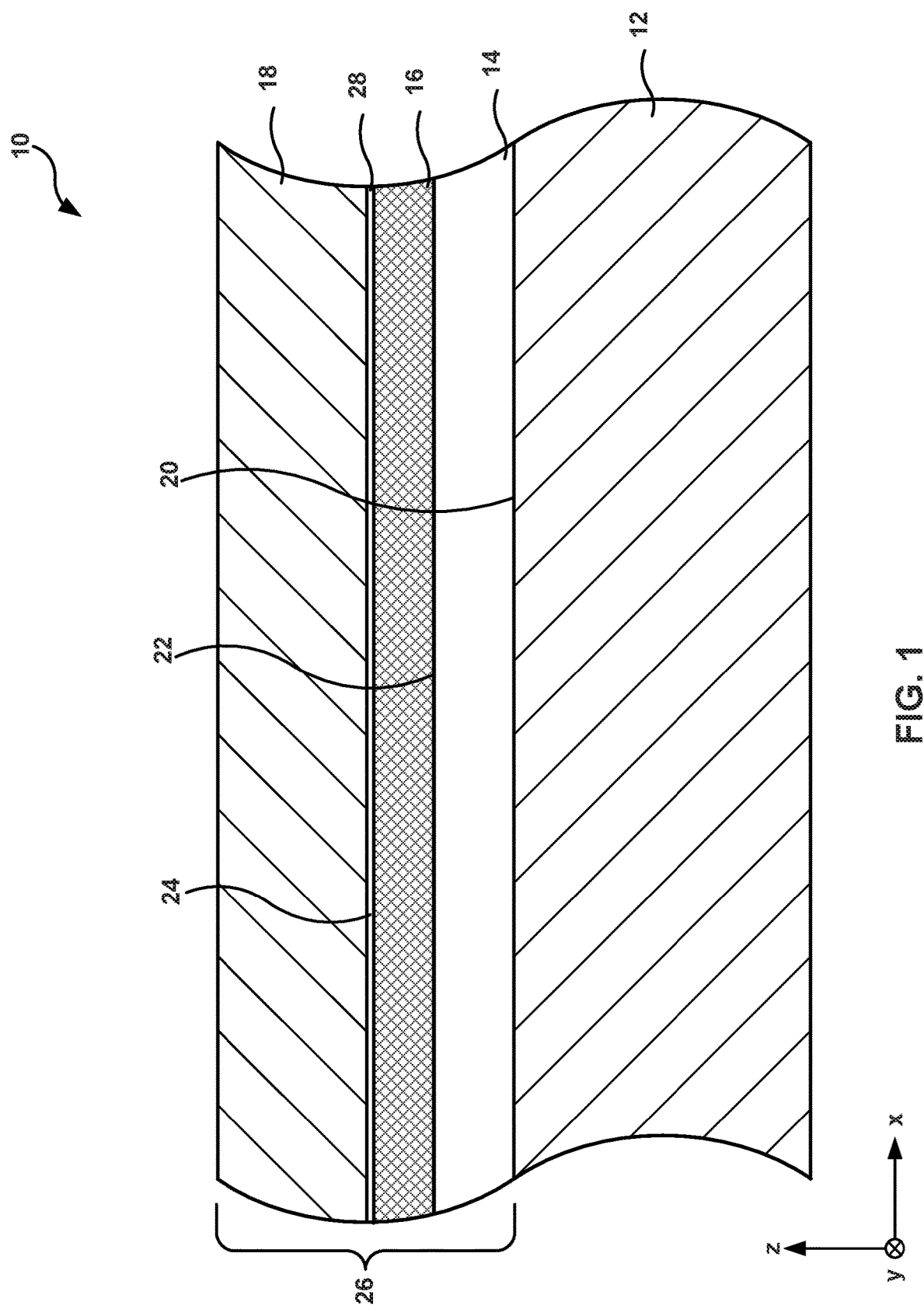
FIG. 1 is a conceptual diagram illustrating an example article that includes a ceramic matrix composite (CMC) substrate and a coating that includes an impurity barrier layer, a bond coat, and an overlying layer.

The disclosure describes articles and techniques including CMC substrates with an impurity barrier layer between the CMC substrate and an overlying layer. The overlying layer may include, for example, a bond coat, an environmental barrier coating (EBC), an abradable layer, a thermal barrier coating (TBC), a calcia-magnesia-aluminosilicate (CMAS)-resistant layer, or the like. The impurity barrier layer may include a first coating material, which may be selected to reduce migration of one or more impurities from the CMC substrate into the overlying layer. Example techniques may include depositing a composite feedstock onto a CMC substrate, where the composite feedstock includes the first coating material and a second coating material selected to reduce thermal decomposition of the first coating material during a thermal spraying process.

In some examples, CMC substrates may include certain elements and compounds that may adversely affect the properties of the respective layer(s), such as by reacting with other elements or compounds of the respective layers. For example, a CMC substrate may contain impurities, including, boron or aluminum, that may migrate into the overlying layer during thermal cycling of high temperature mechanical systems. In some examples, the reactions between boron or aluminum and elements or compounds in the overlying layer may result in formation of unwanted chemical species, result in accelerated regression or spallation of the overlying layers, or the like, thereby diminishing the useful life of the article.

For example, oxygen that migrates from the external environment to contact a bond coat that includes silicon can react with the silicon to form an oxide layer, e.g., silicon dioxide (silica; $SiO_2$), at the interface between the bond layer and an overlying layer. While some silica scale may be acceptable, the unchecked growth of the silica layer may result in damage to the article. For example, excess silica may cause thermal expansion mismatches between the bond layer and the overlying layer, which may result in mechanical stress at the interface and, ultimately, the spallation of the overlying layer. Certain compounds, such as boria (e.g., boron trioxide ($B_2O_3$)) may negatively affect the growth rate of the silica scale. In some examples, boria may reduce the viscosity of the silica scale, catalyze the growth of the silica scale, transform the silica scale from an otherwise amorphous state to an at least partially crystalline structure, or the like; ultimately leading to the degradation of the coating.

The impurity barrier layer described herein may reduce or substantially inhibit elements or compounds in the CMC substrate, such as boron, from migrating to, and reacting with or otherwise damaging, the overlying layer. In some examples, the impurity barrier layer may include silicon carbide and/or silicon nitride. In some examples, the impurity barrier layer may be deposited on a CMC substrate by a thermal spraying process. In some examples, the impurity barrier layer may be deposited from a composite coating feedstock, which may include a first coating material, such as silicon carbide or silicon nitride, and a second material, which may at least partially encapsulate the first coating material. The second coating material may reduce thermal degradation of the first coating material during thermal spraying. In this way, the disclosure describes articles and techniques including CMC substrates with an impurity barrier layer between the CMC substrate and an overlying layer to increase the useful life of high temperature mechanical system components compared to components without an impurity barrier or components formed by different techniques.

FIG. 1 is a conceptual and schematic diagram illustrating an example article 10 including a substrate 12 and a coating 26. In some examples, coating 26 may include an impurity barrier layer 14, a bond coat 16, and an overlying layer 18. In other examples, coating 26 may include fewer than three layers. For example, coating 26 may include impurity barrier layer 14 and overlying layer 18. In some examples, coating 26 may include more than three layers. For example, overlying layer 18 may include more than one layer.

Substrate 12 may be a component of a high temperature mechanical system. For example, substrate 12 may be a blade track, an airfoil, a blade, a vane, a combustion chamber liner, or the like, of a gas turbine engine. In some examples, substrate 12 includes a ceramic, a ceramic matrix composite (CMC), or a metal alloy that includes silicon metal. In some examples, substrate 12 may include a silicon metal-based material, such as silicon-based ceramic, a silicon-based CMC, or a silicon-based alloy.

In examples in which substrate 12 includes a ceramic, the ceramic may be substantially homogeneous. In some examples, substrate 12 including a ceramic may include a silicon-containing ceramic, such as, for example: silicon oxide ($SiO_2$), silicon carbide (SiC), or silicon nitride ($Si_3N_4$); aluminum oxide ($Al_2O_3$); aluminosilicate (e.g., $Al_2SiO_5$); or the like. In other examples, substrate 12 may include a metal alloy that includes silicon, such as a molybdenum-silicon alloy (e.g., $MoSi_2$) or a niobium-silicon alloy (e.g., $NbSi_2$).

In examples in which substrate 12 includes a CMC, substrate 12 may include a matrix material and a reinforcement material. The matrix material may include a ceramic material, such as, for example, SiC, $Si_3N_4$, $Al_2O_3$, aluminosilicate, $SiO_2$, or the like. The CMC may further include a continuous or discontinuous reinforcement material. For example, the reinforcement material may include discontinuous whiskers, platelets, or particulates. As other examples, the reinforcement material may include a continuous monofilament or multifilament weave. In some examples, the reinforcement material may include SiC, $Si_3N_4$, $Al_2O_3$, aluminosilicate, $SiO_2$, or the like. In some examples, substrate 12 may include a SiC—SiC CMC, in which a fibrous preform including SiC fibers is impregnated with SiC particles from a slurry, then melt infiltrated with silicon metal or a silicon alloy to form the melt-infiltrated SiC—SiC CMC.

As shown in FIG. 1, substrate 12 defines a surface 20 on which impurity barrier 14 is disposed, and impurity barrier 14 defines a surface 22 on which bond coat 16 is disposed. In some examples, article 10 may include bond coat 16 disposed directly on surface 22 with no intermediate layers between impurity barrier layer 14 and bond coat 16. In other examples, bond coat 16 may not be disposed directly on surface 22, i.e., one or more additional intermediate layers may be disposed between impurity barrier layer 14 and bond coat 16. For example, an additional intermediate bond coat layer may be disposed between impurity barrier layer 14 and bond coat 16. In some examples, bond coat 16 may be on all of surface 22 of impurity barrier layer 14. In other examples, bond coat 16 may be on only a part of surface 22 of impurity barrier layer 14. For example, bond coat 16 may be on a portion of impurity barrier layer 14 that is exposed to a flow path of hot gases in a gas turbine engine. In other examples, bond coat 16 may be on non-gas flow path areas, such as a backside of a seal segment or a blade dovetail region.

Bond coat 16 may include a composition that provides adherence between impurity barrier layer 14 and a layer formed on bond coat 16, such as overlying layer 18. In some examples, the adherence provided by bond coat 16 between impurity barrier layer 14 and overlying layer 18 may be greater than the adherence between impurity barrier layer 14 and overlying layer 18, without bond coat 16.

In some examples, bond coat 16 may include a composition that may be stable at temperatures above 1350° C. and/or above about 1410° C. In this way, bond coat 16 may allow use of article 10 at temperatures which lead to temperatures of bond coat 16 above 1350° C. and/or above about 1410° C. In some examples, article 10 may be used in an environment in which ambient temperature is greater than the temperature at which bond coat 16 is thermally stable, e.g., because bond coat 16 may be coated with at least one layer, such as overlying layer 18, that provides thermal insulation to bond coat 16 and reduces the temperature experienced by bond coat 16 compared to the ambient temperature or the surface temperature of the layer(s) formed on bond coat 16, e.g., overlying layer 18.

Bond coat 16 may include silicon metal (e.g., elemental silicon; Si), a silicon-containing alloy, a silicon-containing ceramic, or a silicon-containing compound. In some examples, the presence of Si in bond coat 16 may promote adherence between bond coat 16 and impurity barrier layer 14, such as, for example, when impurity barrier layer 14 includes silicon metal or a silicon-containing alloy or compound.

Bond coat 16 may optionally include at least one additive. The optional at least one additive may include, for example, at least one of SiC, a melting point depressant, an oxidation enhancer, a transition metal carbide, a transition metal boride, or a transition metal nitride. SiC may affect the properties of bond coat 16. For example, SiC particles may modify oxidation resistance of bond coat 16, modify chemical resistance of bond coat 16, influence the coefficient of thermal expansion (CTE) of bond coat 16, or the like. In some examples, bond coat 16 may include between about 1 vol. % and about 40 vol. % SiC, such as between about 1 vol. % and about 20 vol. % SiC, or between about 5 vol. % and about 40 vol. % SiC, or between about 5 vol. % and about 20 vol. % SiC.

In examples in which bond coat 16 includes a melting point depressant, the melting point depressant may include a metal or alloy, such as at least one of zirconium metal, yttrium metal, titanium metal, aluminum metal, chromium metal, niobium metal, tantalum metal, or a rare earth metal. Rare earth metals may include Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples in which bond coat 16 includes a melting point depressant, bond coat 16 may include greater than 0 wt. % and less than about 30 wt. % of the melting point depressant, such as greater than 0 wt. % and less than about 10 wt. % of the melting point depressant. The melting point depressant may reduce a melting point of a bond coat precursor of bond coat 16 that is formed as part of the technique for forming bond coat 16. This may allow melting of the bond coat precursor at lower temperatures, which may reduce a chance that the melting of the bond coat precursor to form bond coat 16 damages substrate 12 or impurity barrier layer 14.

In examples in which bond coat 16 includes an oxidation enhancer, the oxidation enhancer may include at least one of molybdenum, hafnium, or ytterbium. In some examples in which bond coat 16 includes an oxidation enhancer, bond coat 16 may include greater than 0 wt. % and less than about 10 wt. % of the oxidation enhancer. The oxidation enhancer may facilitate formation of a stable oxide scale on a surface of bond coat 16, which may increase adhesion between bond coat 16 and overlying layer 18, reduce diffusion of elements through bond coat 16, or both.

Bond coat 16 additionally or alternatively may include at least one of a transition metal carbide, a transition metal boride, or a transition metal nitride. Bond coat 16 may include silicon and at least one transition metal carbide; silicon and at least one transition metal boride; silicon and at least one transition metal nitride; silicon, at least one transition metal carbide, and at least one transition metal boride; silicon, at least one transition metal carbide, and at least one transition metal nitride; silicon, at least one transition metal boride, and at least one transition metal nitride; or silicon, at least one transition metal carbide, at least one transition metal boride, and at least one transition metal nitride. The transition metal may include, for example, Cr, Mo, Nb, W, Ti, Ta, Hf, or Zr. The at least one transition metal carbide may include at least one of $Cr_3C_2$, $Cr_7C_3$, $Cr_{23}C_6$, $Mo_2C$, NbC, WC, TaC, HfC, or ZrC. The at least one transition metal boride may include at least one of TaB, $TaB_2$, $TiB_2$, $ZrB_2$, HfB, or $HfB_2$. The at least one transition metal nitride may include at least one of TiN, ZrN, HfN, $Mo_2N$, or TaN.

In some examples, bond coat 16 may include between about 40 volume percent (vol. %) and about 99 vol. % silicon and a balance of the at least one of a transition metal carbide, a transition metal nitride, or a transition metal boride. In some examples, bond coat 16 may include between about 1 vol. % and about 30 vol. %, or between about 5 vol. % and about 20 vol. % of the at least one of a transition metal carbide, a transition metal boride, or a transition metal nitride, and a balance silicon metal and any additional constituents. The particular composition ranges may vary based on the CTE of the at least one of a transition metal carbide, a transition metal boride, or a transition metal nitride.

Transition metal carbides, transition metal borides, and transition metal nitrides may have a different CTE than silicon metal. For example, transition metal carbides and transition metal borides may have CTEs between about 5 ppm/° C. and about 8 ppm/° C., and transition metal nitrides may have CTEs of about 9 ppm/° C. By mixing silicon and a transition metal carbide, a transition metal boride, or transition metal nitride, the CTE of bond coat 16 may be increased to more closely match the CTE of substrate 12, the CTE of impurity barrier layer 14, the CTE of overlying layer 18, or any combination thereof. This may reduce stress at the interfaces between bond coat 16 and adjacent layers during thermal cycling of article 10.

Additionally or alternatively, the addition of the at least one of the transition metal carbide, the transition metal boride, or the transition metal nitride may improve oxidation resistance of bond coat 16 compared to a bond layer including only silicon. For example, the at least one of the transition metal carbide, the transition metal boride, or the transition metal nitride may be incorporated into a thermally grown silicon oxide on a surface 24 of bond coat 16, which may improve adherence of the thermally grown silicon oxide to bond coat 16, decrease oxygen diffusivity through the thermally grown silicon oxide (which reduces the rate of oxidation of the remaining bond layer), or both.

Bond coat 16 may define any suitable thickness, measured in a direction substantially normal to surface 22 of impurity barrier layer 14. In some examples, bond coat 16 defines a thickness of between about 0.5 mils (about 12.7 micrometers) and about 40 mils (about 1016 micrometers), such as between about 1 mils (about 25.4 micrometers) and about 10 mils (about 254 micrometers).

Bond coat 16 may be formed on impurity barrier layer 14 using, for example, thermal spraying, e.g., air plasma spraying, high velocity oxy-fuel (HVOF) spraying, low vapor plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

As shown in FIG. 1, bond coat 16 defines a surface 24 on which overlying layer 18 is disposed. Overlying layer 18 may include, for example, an environmental barrier coating (EBC), an abradable layer, a thermal barrier coating (TBC), a calcia-magnesia-aluminosilicate (CMAS)-resistant layer, or the like. In some examples, a single overlying layer 18 may perform two or more of these functions. For example, an EBC may provide environmental protection, thermal protection, CMAS-resistance, and the like to substrate 12. As another example, an abradable layer may provide wear protection, impact protection, and the like to substrate 12. In some examples, instead of including a single overlying layer 18, article 10 may include a plurality of overlying layers, such as at least one EBC layer, at least one abradable layer, at least one TBC layer, at least one CMAS-resistant layer, or combinations thereof.

Overlying layer 18 may be formed on surface 24 of bond coat 16 using, for example, thermal spraying, e.g., air plasma spraying, high velocity oxy-fuel (HVOF) spraying, low vapor plasma spraying; PVD, including EB-PVD, DVD, and cathodic arc deposition; CVD; slurry process deposition; sol-gel process deposition; electrophoretic deposition; or the like.

An EBC layer may include at least one of a rare earth oxide, a rare earth silicate, an aluminosilicate, or an alkaline earth aluminosilicate. For example, an EBC layer may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu, Yb, Tm, Er, Ho, Dy, Tb, Gd, Eu, Sm, Pm, Nd, Pr, Ce, La, Y, or Sc.

In some examples, an EBC layer may include at least one rare earth oxide and alumina, at least one rare earth oxide and silica, or at least one rare earth oxide, silica, and alumina. In some examples, an EBC layer may include an additive in addition to the primary constituents of the EBC layer. For example, the additive may include at least one of $TiO_2$, $Ta_2O_5$, $HfSiO_4$, an alkali metal oxide, or an alkali earth metal oxide. The additive may be added to the EBC layer to modify one or more desired properties of the EBC layer. For example, the additive components may increase or decrease the reaction rate of the EBC layer with CMAS, may modify the viscosity of the reaction product from the reaction of CMAS and the EBC layer, may increase adhesion of the EBC layer to bond coat 16, may increase or decrease the chemical stability of the EBC layer, or the like.

In some examples, the EBC layer may be substantially free (e.g., free or nearly free) of hafnia and/or zirconia. Zirconia and hafnia may be susceptible to chemical attack by CMAS, so an EBC layer substantially free of hafnia and/or zirconia may be more resistant to CMAS attack than an EBC layer that includes zirconia and/or hafnia.

Regardless of the composition of the EBC layer, in some examples, the EBC layer may have a dense microstructure, a porous microstructure, a columnar microstructure, or a combination of at least two of dense, porous, or columnar microstructures. A dense microstructure may be more effective in preventing the infiltration of CMAS and other environmental contaminants, while a porous or columnar microstructure may be more strain tolerant during thermal cycling. In some examples, an EBC layer with a dense microstructure may have a porosity of less than about 10 vol. %, such as less than about 8 vol. %, less than about 5 vol. %, or less than about 2 vol. %, where porosity is measured as a percentage of pore volume divided by total volume of the EBC layer. In some examples, an EBC layer with a porous microstructure may have a porosity of more than about 10 vol. %, such as more than about 15 vol. %, more than about 20 vol. %, or more than about 30 vol. %, where porosity is measured as a percentage of pore volume divided by total volume of the EBC layer.

As described above, the EBC layer may be used as a single overlying layer 18 or may be used in combination with at least one other layer, such as an abradable layer or TBC layer.

Overlying layer 18 additionally or alternatively may include an abradable layer. Abradability may include a disposition to break into relatively small pieces when exposed to a sufficient physical force. Abradability may be influenced by the material characteristics of the abradable layer, such as fracture toughness and fracture mechanism (e.g., brittle fracture), as well as the porosity of the abradable layer. Thermal shock resistance and high temperature capability may be important for use in a gas turbine engine, in which the abradable layer is exposed to wide temperature variations from high operating temperatures to low environmental temperatures when the gas turbine engine is not operating. In addition to at least some of the above properties, the abradable layer may possess other properties.

The abradable layer may include any suitable material. For example, the abradable layer may include at least one of a rare earth oxide, a rare earth silicate, an aluminosilicate, or an alkaline earth aluminosilicate. For example, an abradable layer may include mullite, BSAS, BAS, SAS, at least one rare earth oxide, at least one rare earth monosilicate, at least one rare earth disilicate, or combinations thereof. In some examples, the abradable layer may include any of the compositions described herein with respect to the EBC layer.

The abradable layer may be porous. Porosity of the abradable layer may reduce a thermal conductivity of the abradable layer and/or may affect the abradability of the abradable layer. In some examples, the abradable layer includes porosity between about 10 vol. % and about 50 vol. %. In other examples, the abradable layer includes porosity between about 15 vol. % and about 35 vol. %, or about 20 vol. %. Porosity of the abradable layer is defined herein as a volume of pores or cracks in the abradable layer divided by a total volume of the abradable layer (including both the volume of material in the abradable layer and the volume of pores/cracks in the abradable layer).

The abradable layer may be formed using, for example, a thermal spraying technique, such as, for example, plasma spraying. Porosity of the abradable layer may be controlled by the use of coating material additives and/or processing techniques to create the desired porosity. In some examples, substantially closed pores may be desired.

For example, a coating material additive that melts or burns at the use temperatures of the component (e.g., a blade track) may be incorporated into the coating material that forms the abradable layer. The coating material additive may include, for example, graphite, hexagonal boron nitride, or a polymer such as a polyester, and may be incorporated into the coating material prior to deposition of the coating material over substrate 12 to form the abradable layer. The coating material additive then may be melted or burned off in a post-formation heat treatment, or during operation of the gas turbine engine, to form pores in the abradable layer. The post-deposition heat-treatment may be performed at up to about 1500° C.

The porosity of the abradable layer can also be created and/or controlled by plasma spraying the coating material using a co-spray process technique in which the coating material and coating material additive are fed into the plasma stream with two radial powder feed injection ports. The feed pressures and flow rates of the coating material and coating material additive may be adjusted to inject the material on the outer edge of the plasma plume using direct 90-degree angle injection. This may permit the coating material particles to soften but not completely melt and the coating material additive to not burn off but rather soften sufficiently for adherence in the abradable layer.

As described above, the abradable layer may be used as a single overlying layer 18 or may be used in combination with at least one other layer, such as an EBC layer or TBC layer.

Overlying layer 18 additionally or alternatively may include a TBC layer. The TBC may have a low thermal conductivity (i.e., both an intrinsic thermal conductivity of the material(s) that forms the TBC and an effective thermal conductivity of the TBC as constructed) to provide thermal insulation to substrate 12, bond coat 16, and/or overlying layer 18. Heat is transferred through the TBC through conduction and radiation. The inclusion of rare earth oxides such as ytterbia, samaria, lutetia, scandia, ceria, gadolinia, neodymia, europia, yttria-stabilized zirconia (YSZ), zirconia stabilized by a single or multiple rare earth oxides, hafnia stabilized by a single or multiple rare earth oxides, zirconia-rare earth oxide compounds, such as $RE_2Zr_2O_7$ (where RE is a rare earth element), hafnia-rare earth oxide compounds, such as $RE_2Hf_2O_7$ (where RE is a rare earth element), and the like as dopants may help decrease the thermal conductivity (by conduction) of the TBC.

As described above, the TBC layer may be used as a single overlying layer 18 or may be used in combination with at least one other layer, such as an EBC layer or an abradable layer.

As shown in FIG. 1, article 10 includes impurity barrier layer 14. Impurity barrier layer 14 may reduce migration of elements or compounds from substrate 12 to the outer layers of article 10, for example, overlying layer 18. For example, substrate 12 may include impurities, such as aluminum, boron, calcium, and the like, that may detrimentally affect one or more layers of coating 26. As described above, during operation of article 10 in high temperature environments, trace amounts of the impurities, either as elements or compounds thereof (e.g., boria), present within substrate 12 may migrate or diffuse from substrate 12 into one or more of the outer coating layers of article 10 (e.g., bond coat 16, overlying layer 18, or both). In the absence of impurity barrier layer 14, the impurities may interact with compounds present in the layers of coating 26, including, for example, silica scale 28, which may form at the interface between bond layer 16 and overlying layer 18 during thermal cycling. In some such examples, the impurities may reduce the viscosity of silica scale 28, catalyze the growth of the silica scale, transform at least a portion of the silica scale from an otherwise amorphous state to a crystalline structure, or the like; ultimately leading to the degradation of the outer coating layers. For example, boria or calcium compounds from substrate 12 may change the amorphous structure of silica scale 28 to a crystalline cristobalite structure causing embrittlement of the scale layer or a significant volume change in the cristobalite structure during thermal cycling. This may cause portions of silica scale 28 to be more likely to crack under strain. In some examples, the resultant degradation induced from the migrating impurities may cause delamination, spallation, damage, embrittlement, or cracking of bond layer 16, silica scale 28, or overlying layer 18, thereby reducing the service life of article 10.

Impurity barrier layer 14 may inhibit the migration of impurities from substrate 12 into outer layers of article 10 (e.g., overlying layer 18). Impurity barrier layer 14 may include at least a first coating material selected to reduce the migration of impurities from substrate 12 into overlying layer 18. For example, the first coating material may be selected to interact with, or otherwise impede the migration of impurities, such as boron, from substrate 12 into overlying layer 18. In some examples, the first coating material may include silicon carbide, silicon nitride, and the like. In some examples, impurity barrier layer 14 may inhibit migration of impurities from substrate 12 into the other layers of coating 26. For example, the diffusion rate of boron in impurity barrier layer 14 (e.g., SiC or SiN) may less than the diffusion rate in silicon due to the presence of point defects in impurity barrier 14. As another example, vacancy related diffusion of boron in impurity barrier layer 14 (e.g., SiC or SiN) may have a higher activation energy than vacancy related diffusion of boron in silicon. In this way, impurity barrier layer 14 may reduce the migration of impurities from substrate 12 into overlying layer 18.

In some examples, impurity barrier layer 14 may include a second coating material. In some examples, the second coating material may be selected to not adversely affect the chemical properties or mechanical properties of the first coating material to inhibit migration of impurities from substrate 12 into coating 26. In some examples, the second coating material may be different from the first coating material. For example, the first coating material may include a different material composition compared to the material composition of the second coating material. In some examples, the different material composition may include one or more different base components, one or more different additives, one or more different dopants, one or more different amounts of an additive or a dopant, or the like. In some examples, the different material composition may include the same composition with different microstructure, e.g., amorphous, semicrystalline, or crystalline. In some examples, the second coating material may include at least one of a rare earth silicate, a rare earth disilicate, a transition metal, alumina, yttria-alumina-garnet (YAG), a silicon carbide based ceramic, a silicon nitride based ceramic, or the like. For example, the transition metal may include molybdenum, copper, tungsten, or the like.

Impurity barrier layer 14 may be formed on substrate 12 using any suitable thermal spraying technique, such as, for example, air or inert gas shrouded plasma spraying, high velocity oxy-fuel (HVOF) spraying, detonation spraying, solution or suspension plasma spraying, low vapor plasma spraying, or the like.

In some examples, the thickness of impurity barrier layer 14 measured in the z-axis direction of FIG. 1 may be selected based at least in part on the chemical properties or mechanical properties of impurity barrier layer 14. For example, the thickness of impurity barrier layer 14 may be selected to reduce CTE mismatches between substrate 12 and bond coat 16 or overlying layer 18 to reduce stress between the layers of coating 26. In some examples, the thickness of impurity barrier layer 14 may be between about 1 mils (about 25.4 microns) and about 100 mils (about 2540 microns), or between about 2 mils (about 50.8 microns) and about 30 mils (about 762 microns). In this way, impurity barrier layer 14 may inhibit the migration of impurities from substrate 12 into outer layers of article 10 (e.g., overlying layer 18).

Figure 2:
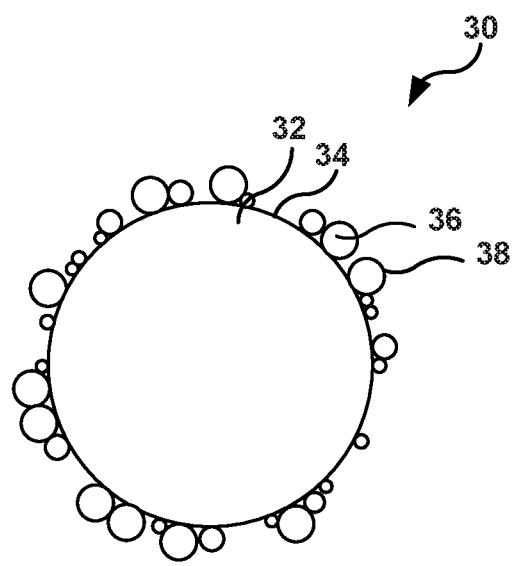
FIG. 2 is a conceptual diagram illustrating an example composite coating feedstock that includes a first coating material and a second coating material that may be different from the first coating material.
Figure 3:
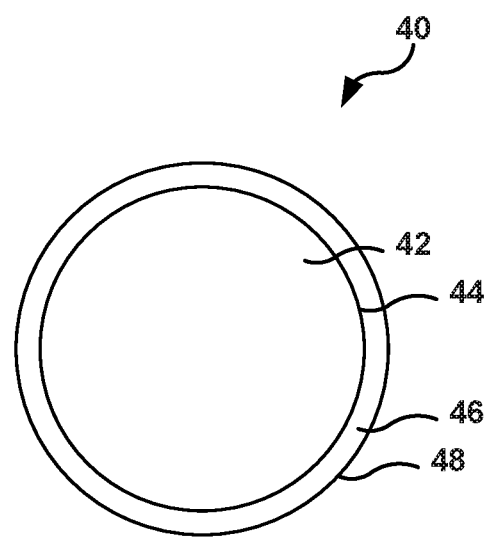
FIG. 3 is a conceptual diagram illustrating an example composite coating feedstock that includes a first coating material and a second coating material that may be different from the first coating material.

Impurity barrier layer 14 may include a first coating material and a second coating material, as described above. In some examples, impurity barrier layer 14 may be deposited from a composite coating feedstock, which may include both the first coating material and the second coating material. For example, the first coating material may include a plurality of particles, and the second coating material may at least partially encapsulate the first coating material. FIGS. 2 and 3 are conceptual diagrams illustrating example composite coating feedstocks. In particular, FIG. 2 is a conceptual diagram illustrating an example composite coating feedstock 30 that includes a first coating material 32 and a second coating material 36 that may be different from the first coating material 32. As shown in FIG. 2, first coating material 32 may include a particle that defines a surface 34 on which second coating material 36 is disposed. In some examples, second coating material 36 may adhere to surface 34 to at least partially encapsulate first coating material 32.

In some examples, composite coating feedstock 30 may be formed by physically blending first coating material 32 and second coating material 36, e.g., using milling. For example, first coating material 32 may be formed using a milling technique, which may result in first coating material 32 including a plurality of particles that possess a first average particle size. Similarly, in some examples, second coating material 36 may be formed using a milling technique, which may result in second coating material 36 including a plurality of particles that include a second average particle size. In some examples, first coating material 32 and second coating material 36 may be milled separately. In other examples, first coating material 32 and second coating material 36 may be milled together. Milling may include any suitable milling technique, such as, for example, ball milling, high pressure grinding rolls, or the like. In some examples, after milling, the particles of first coating material 32, the particles or second coating material 36, or both, may be sorted or filtered to result in a selected size distribution. For example, the particles may be sorted or filtered using sieving, mechanical screening, or the like. Milling and sorting or filtering may allow selection of an average particle size of one or both of first and second coating materials 32 and 36.

In some examples, as shown in FIG. 2, the average particle size of the particles of first coating material 32 may be larger than the average particle size of the particles of second coating material 36. In other examples, the average particle size of the particles of first coating material 32 may be the same or substantially the same as the average particle size of the particles of second coating material 36. For example, the average particle size of the particles of first coating material 32 may be between about between about 0.05 microns and about 50 microns, or between about 0.1 microns and about 25 microns. The average particle size of the second coating material 36 may be between about 0.01 microns and about 50 microns, or between about 0.01 microns and about 25 microns, between about 0.01 microns and about 10 microns, or between about 0.05 microns and about 5 microns.

In some examples, sufficient electrostatic or other cohesive forces may be generated during physical blending of first coating material 32 and second coating material 36 such that at least some particles of second coating material 36 adhere to surface 34 of at least some particles of first coating material 32 to produce a composite coating feedstock 30. In other examples, first coating material 32 and second coating material 36 may be physically blended and wet milled, or otherwise processed to form a suspension of first coating material 32 and second coating material 36 in at least one fluid, then the suspension may be spray dried such that at least some particles of second coating material 36 adhere to surface 34 of at least some particles of first coating material 32 to produce a composite coating feedstock 30. In some examples, after spray drying, the composite coating feedstock 30 may be heated to further adhere at least some particles of second coating material 36 to surface 34 of at least some particles of first coating material 32. In this way, physically blending the first coating material and the second coating material may produce a composite coating feedstock that may be used in a thermal spraying process to deposit an impurity barrier layer 14 (FIG. 1).

Second coating material 36 may be configured to reduce or substantially inhibit first coating material 32 from thermally decomposing during the thermal spray technique used to deposit impurity barrier layer 14. In some examples, second coating material 36 may absorb heat from the heated plume of the thermal spray gun, reducing heating of first coating material 32. In other examples, second coating material 36 may reflect or refract heat from the heated plume. In other examples, second coating material 60 may function as a bonding agent, e.g., second coating material 36 may reduce separation of at least some particle clusters of first coating material 32 to reduce thermal decomposition of individual particles of first coating material 32. Reducing or substantially inhibiting thermal decomposition of first coating material 32 may allow application of first coating material 32 to substrate 12 by a thermal spraying process.

FIG. 3 is a conceptual diagram illustrating another example composite coating feedstock 40 that includes a first coating material 42 and a second coating material 46 that may be different from the first coating material 42. As shown in FIG. 3, a first coating material 42 includes a particle that defines a surface 44 on which second coating material 46 is disposed. For example, second coating material 46 may be formed on surface 44 by sol-gel process, chemical vapor deposition, refractory precursor coating, or the like. In some examples, second coating material 46 may at least partially encapsulate first coating material 42. In other examples, second coating material 46 may substantially fully encapsulate first coating material 42. A surface 48 of second coating material 46 may define the exterior of composite coating feedstock 40.

In some examples, the thickness of second coating material 46, measured radially from surface 44 to surface 48 may be between about 10 nanometers and about 10 microns, or between about 50 nanometers and about 5 microns. In some examples, the thickness of second coating material 46 may be selected to not adversely affect the chemical properties or mechanical properties of first coating material 42 in an impurity barrier layer (e.g., impurity barrier layer 14 of FIG. 1).

Figure 4:
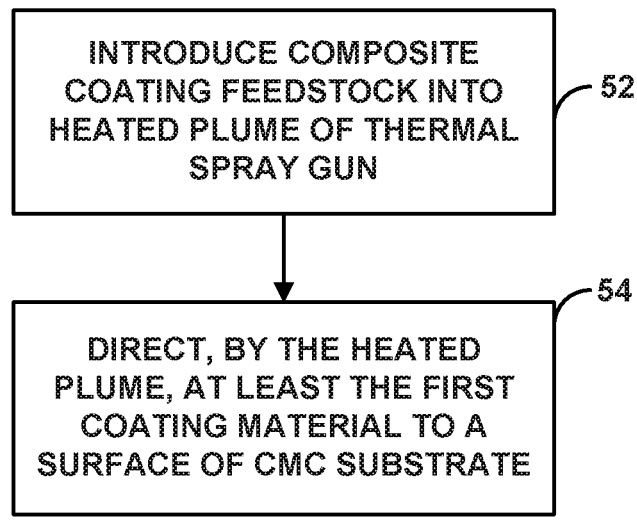
FIG. 4 is a flow diagram illustrating an example technique for coating a CMC substrate with a composite coating feedstock to form an impurity barrier layer.

FIG. 4 is a flow diagram illustrating an example technique for coating a CMC substrate 12 with a composite coating feedstock to form an impurity barrier layer 14. The technique of FIG. 4 will be described with respect to article 10 of FIG. 1 for ease of description only. A person having ordinary skill in the art will recognize and appreciate that the technique of FIG. 4 may be used to form articles other than article 10 of FIG. 1.

The technique of FIG. 4 may include introducing a composite coating feedstock that includes a first coating material and a second coating material to a heated plume of a thermal spray gun (52). The composite coating feedstock may include, for example, composite coating feedstock 30 of FIG. 2 or composite coating feedstock 40 of FIG. 3. For example, the composite coating feedstock may include a plurality of particles that include a first coating material 32 or 42 and a second coating material 36 or 46.

The composite coating feedstock may be introduced into the plume of the thermal spray gun using any suitable technique. For example, composite coating feedstock may be introduced into the plume of the thermal spray gun by a gravimetric powder feeder, a rotating disk powder feeder, or the like. The heated plume of the thermal spray gun may be formed by any suitable thermal spraying process. For example, the thermal spraying process may include air or inert gas shrouded plasma spraying, high velocity oxy-fuel (HVOF) spraying, detonation spraying, solution or suspension plasma spraying, low vapor plasma spraying, or the like. In some examples, the composite coating feedstock may be introduced into the heated plume by introducing the composite coating feedstock internally to the thermal spray gun, e.g., within a space between the cathode and the anode of a plasma spray gun or into a combustion chamber of a HVOF or detonation spray gun. In other examples, the composite coating feedstock may be introduced into the heated plume externally of the thermal spray gun.

The technique of FIG. 4 also may include, after introducing the composite coating feedstock to the heated plume of the thermal spray gun (52), directing, by the heated plume, at least the first coating material to a surface of substrate 12 to deposit an impurity barrier layer 14 that includes at least the first coating material (54). For example, the thermal spray gun may be configured to move the heated plume relative to a stationary surface of substrate 12 to direct at least the first coating material to the surface of substrate 12 to deposit impurity barrier layer 14 that includes at least the first coating material. In other examples, a thermal spraying system may be configured to move a surface of substrate 12 relative to a stationary heated plume of the thermal spray gun. For example, substrate 12 may be detachably fixed to a moveable platform of the thermal spraying system. In other examples, a thermal spraying system may be configured to move both the thermal spray gun and substrate.

The first coating material and the second coating material may be substantially similar to the first and second coating material described above with respect to FIGS. 1-3. For example, the first coating material may include silicon carbide or silicon nitride. In some examples, the first coating material may include a plurality of first particles. The second coating material may at least partially encapsulate at least some of the plurality of first particles. The second coating material may include, for example, a rare earth silicate, a rare earth disilicate, a transition metal, alumina, YAG, a silicon carbide based ceramic, a silicon nitride based ceramic, or the like. For example, the transition metal may include molybdenum, copper, tungsten, or the like. The second coating material may reduce or substantially inhibit the thermal decomposition of at least a portion of the first coating material in the heated plume.

In some examples, the technique of FIG. 2 may optionally include, after directing at least the first coating material to the surface of the CMC substrate 12 (54), applying bond coat 16 on a surface 22 of the at least the first coating material. For example, bond coat 16 may be formed on surface 22 of impurity barrier layer 14 using thermal spraying, e.g., air plasma spraying, high velocity oxy-fuel (HVOF) spraying, low vapor plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like. Bond coat 16 may define surface 24.

In some examples, the technique of FIG. 2 may optionally include, after applying bond coat 16, applying overlying layer 18 on bond coat 16. As described above, overlying layer 18 may include at least one of an EBC, a TBC, an abradable coating, a CMAS-resistant layer (either separately or as part of the EBC), or the like. For example, overlying layer 18 may be formed on surface 24 of bond coat 16 using thermal spraying, e.g., air plasma spraying, high velocity oxy-fuel (HVOF) spraying, low vapor plasma spraying; PVD, including EB-PVD, DVD, and cathodic arc deposition; CVD; slurry process deposition; sol-gel process deposition; electrophoretic deposition; or the like. In other examples, overlying layer 18 may be formed directly on impurity barrier 14. In some examples, the first coating material of impurity barrier layer 14 may reduce the migration of an impurity from substrate 12 into overlying layer 18.

In some examples, the technique of FIG. 2 may optionally include forming the composite coating feedstock. Forming the composite coating feedstock may include at least one of physical blending, sol-gel process, chemical vapor deposition, or refractory precursor coating. For example, as discussed above with respect to FIG. 1, composite coating feedstock may include the first and second coating materials. The first coating material of the composite coating feedstock may include a plurality of first particles. The second coating material of the composite coating feedstock may at least partially encapsulate at least a portion of a surface of at least some of the first particles. For example, second coating material may at least partially adhere to, or be formed on, a surface of first coating material particles.

Figure 5:
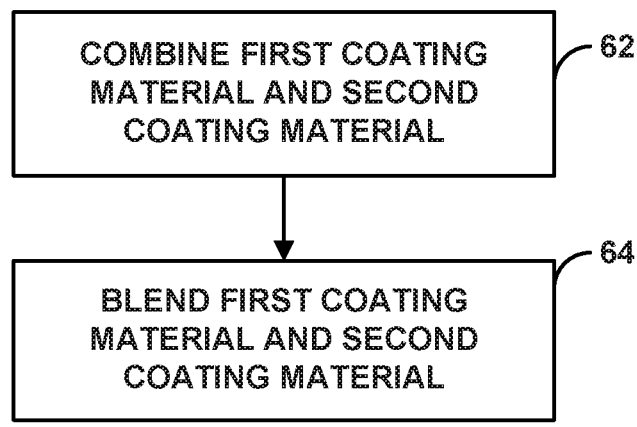
FIG. 5 is a flow diagram illustrating an example technique forming a composite coating feedstock that includes a first coating material and a second coating material that may be different from the first coating material.

FIG. 5 is a flow diagram illustrating an example technique forming a composite coating feedstock that includes a first coating material and a second coating material that may be different from the first coating material. The technique of FIG. 5 will be described with respect to composite coating feedstock 30 of FIG. 2 for ease of description only. A person having ordinary skill in the art will recognize and appreciate that the technique of FIG. 5 may be used to form composite coating feedstocks other than composite coating feedstock 30 of FIG. 2.

The technique of FIG. 5 may include combining first coating material 32 and second, different coating material 46 (62). In some examples, first coating material 32 and second coating material 36 each may by introduced into any type of vessel suitable for blending of dry material, such as, for example, a rotary drum, a ribbon blender, an auger, or the like. In other examples, first coating material 32 and second coating material 36 each may by introduced into any type of suitable storage vessels, such as, for example, a drum, a hopper, a silo, or the like. In the example technique of FIG. 5, first and second coating materials 32 and 36 may be the same or substantially similar to the first and second materials as described above with respect to FIGS. 1-3.

The technique of FIG. 5 also may include blending first coating material 32 and second coating material 36 (64). Blending may include dry blending by any suitable means, such as, for example, a rotary drum, a ribbon blender, an auger mixer, a whirlwind mixer, a milling apparatus, or the like. In some examples, blending may include sufficient mixing to produce a substantially consistent distribution of first coating material 32 and second coating material 36. Additionally, blending may include applying sufficient force between particles of first coating material 32 and particles of second coating material 36 to cause or facilitate particles of second coating material 36 attaching to surfaces of particles of first coating material 32. For example, second coating material 36 may be brought in contact with first coating material 32 such that at least a portion of second coating material 36 at least partially attaches to surface 34 of at least some of first coating material particles 32. In this way, the technique of FIG. 5 may be used to form a composite coating feedstock (e.g., composite coating feedstock 30 of FIG. 2) for thermal spraying an impurity barrier layer (e.g., impurity barrier layer 14 of FIG. 1).

Figure 6:
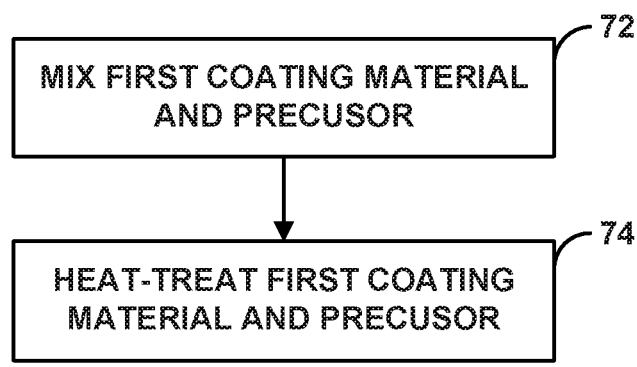
FIG. 6 is a flow diagram illustrating an example technique forming a composite coating feedstock that includes a first coating material and a second coating material that may be different from the first coating material.

FIG. 6 is a flow diagram illustrating another example technique forming a composite coating feedstock that includes a first coating material and a second coating material that may be different from the first coating material. The technique of FIG. 6 will be described with respect to composite coating feedstock 40 of FIG. 3 for ease of description only. A person having ordinary skill in the art will recognize and appreciate that the technique of FIG. 6 may be used to form composite coating feedstocks other than composite coating feedstock 40 of FIG. 3.

The technique of FIG. 6 may include mixing first coating material 52 that includes a plurality of first material particles 42 and a precursor of second coating material 46 (62). The first coating material 42 may be the same or substantially similar to the first coating material as described above with respect to FIGS. 1-3. The precursor may include at least one element or compound that may at least partially encapsulate particles of first coating material 42, and which may be further processed to form second coating material 46.

The precursor may include any suitable precursor material that is converted to second coating material 46 (e.g., a metal, an alloy, a ceramic, or the like). The precursor may be applied to the particles of first coating material 42 in any manner. For example, the precursor may include a suspension or solution in which a material that forms second coating material 46 is suspended or dissolved in a solvent. The suspension or solution may optionally include, for example, a dispersant, a viscosity adjusting agent, a surface tension adjusting agent, or the like. In some examples, the precursor may include at least one of a pre-ceramic polymer solution, a metallic precursor solution, or a metal alkoxide solution.

In some examples, a precursor including a pre-ceramic polymer solution may include a solvent and a pre-ceramic polymer. The solvent may include a polar solvent, for example, an alcohol such as isopropanol, a ketone such as acetone, water, hexane, tetrahydrofuran, toluene, or the like. The solvent may be selected, for example, such that the pre-ceramic polymer is soluble or miscible in the solvent or such that the pre-ceramic polymer solution has a desired viscosity.

The pre-ceramic polymer may include, for example, a polycarbosilane (e.g., polycarbomethylsilane, allyl hydrido polycarbosilane, SMP-10 available from Starfire Systems, Glenville, N.Y., and the like); a polysilazane; or the like. The pre-ceramic polymer may be selected such that heat treatment of the pre-ceramic polymer solution results in a desired ceramic material. In some examples, the pre-ceramic polymer may have a number average molecular weight selected to control, for example, a viscosity of the pre-ceramic polymer solution to control the amount of encapsulation of first coating material particles 42, the thickness of second coating material 46, or the like.

In some examples, the concentration of the pre-ceramic polymer in the pre-ceramic polymer solution may be in the range of about 50 weight percent (wt %) to about 100 wt %. For example, where the pre-ceramic polymer includes 90 wt % SMP-10 and 10 wt % toluene, the concentration of SMP-10 and toluene in the pre-ceramic polymer solution may be in the range of about 50 wt % to about 100 wt %. The weight percent of pre-ceramic polymer in solution may be selected, for example, to control a viscosity of the pre-ceramic polymer solution to control the amount of encapsulation of the particles of first coating material 42, the thickness of second coating material 46, or the like.

In some examples, the pre-ceramic polymer solution may include an at least one additional constituent. For example, the at least one additional constituent may include metal oxide fillers, such as, for example, alumina, magnesia, zirconia, or the like. The metal oxide filler may be selected, for example, such that during heat-treatment a desired ceramic phase is formed by reaction between the ceramic from pre-ceramic polymer and the metal oxide filler. As another example, the at least one additional constituent may include SiC, SiN, or the like. The additional constituents may, for example, reduce cracking during pyrolysis, promote crystal growth during pyrolysis, or the like.

In some examples, the precursor may include a metallic precursor solution. A metallic precursor solution may include a polar solvent and a metallic precursor. The polar solvent may include, for example, water, an alcohol, and the like. The solvent may be selected, for example, such that the metallic precursor is soluble in the solvent. The metallic precursor may include, for example, an ammonium metal oxide, such as $(NH_4)_2Mo_2O_7$, $(NH_4)_6Mo_7O_{24} \cdot 4H_2O$, $(NH_4)_2MoO_4$, $(NH_4)_{10}(H_2W_{12}O_{42}) \cdot 4H_2O$, or the like. The metallic precursor may be selected based on, for example, the ease of reduction of the metallic precursor to a substantially pure metal, the substantially pure metal reduction product, or the like.

In some examples, the concentration of the metallic precursor in the metallic precursor solution may be in the range of about 30 mole percent (mol. %) to about 80 mol. %. For example, where the metallic precursor includes $(NH_4)_2Mo_2O_7$ and water the concentration of $(NH_4)_2Mo_2O_7$ in the metallic precursor solution may be in the range of about 50 mol. % to about 70 mol. %. The weight percent of the metallic precursor in the metallic precursor solution may be selected, for example, to control a viscosity of the metallic precursor solution to control the amount of encapsulation of particles of first coating material 42, the thickness of second coating material 46, or the like.

In some examples, the precursor may include a metal alkoxide solution. A metal alkoxide solution may include a solvent and a metal alkoxide precursor. In some examples, the concentration of the metal alkoxide in the metal alkoxide solution may be in the range of about 20 mole percent (mol. %) to about 80 mol. %. The solvent may include may include a single solvent or a solvent mixture, for example, an alcohol (e.g., ethanol, isopropanol, isobutanol, or the like), an acid (e.g., nitric acid, or the like), and water; or the like. The solvent may be selected, for example, such that the metal alkoxide is soluble or miscible in the solvent. The metal alkoxide may include, for example, an aluminum alkoxide (e.g., aluminum isopropoxide, or the like), a zirconium alkoxide (e.g., zirconium ethoxide, or the like), or the like. The metal alkoxide may be selected, for example, such that heat treatment of the metal alkoxide solution results in a desired ceramic, metal, or alloy phase.

The technique of FIG. 6 also may include, after mixing the first coating and precursor, heat-treating the first coating material and the precursor (74). In some examples, heat-treating first coating material 42 and the precursor may include heat-treating first coating material 42 and the precursor at between about 450° C. to about 1400° C. Heat-treating may include heating first coating material 42 and precursor by any suitable means. For example, heating may include heating by conduction, convection, or radiation using a furnace, a laser, a plasma, an arc welding apparatus, or the like.

In some examples in which the precursor includes a pre-ceramic polymer, heat-treating first coating material 42 and the precursor (74) may include multiple heating steps. For example, heat-treating first coating material 42 and the precursor (74) may include curing the pre-ceramic polymer to crosslink the pre-ceramic polymer. For example, first coating material 42 and the pre-ceramic polymer may be heated at a temperature between about 200° C. and about 400° C. to crosslink the pre-ceramic polymer. After curing the pre-ceramic polymer, the heat-treating of first coating material 42 and the precursor (74) may include pyrolyzing the pre-ceramic polymer to convert the pre-ceramic polymer to a ceramic. For example, first coating material 42 and the cured pre-ceramic polymer may be heated at a rate of about 1° C. to about 3° C. per minute to between about 850° C. and about 1300° C., and held at this temperature for about 1 hour to about 2 hours in an inert atmosphere at atmospheric pressure to convert the pre-ceramic polymer to a ceramic.

In some examples in which the precursor includes a metallic precursor solution, heat-treating first coating material 42 and the precursor (74) may include, for example, after mixing the first coating material 42 and the metallic precursor solution, drying first coating material 42 and the metallic precursor to remove residual solvent from first coating material 42 and the metallic precursor. Drying first coating material 42 and the metallic precursor may be accomplished, for example, by heating first coating material 42 and the metallic precursor at a temperature below a boiling point of the solvent in the metallic precursor, applying a partial vacuum or low pressure to first coating material 42 and the metallic precursor, or the like.

After drying first coating material 42 and the metallic precursor, the heat-treating of first coating material 42 and the precursor (74) may include heat-treating first coating material 42 and the metallic precursor in one or more heating steps to reduce the metallic precursor via a first reduction reaction. For example, where the precursor includes a $(NH_4)_2 Mo_2O_7$ solution, heat-treating first coating material 42 and the precursor to reduce the $(NH_4)_2Mo_2O_7$ may include heat-treating first coating material 42 and the $(NH_4)_2 Mo_2O_7$ at a suitable temperature in an oxygen containing environment (e.g., air of standard atmospheric composition) to reduce the $(NH_4)_2Mo_2O_7$ to $MoO_3$. After the first reduction reaction, first coating material 42 and the metallic precursor may be further heat treated in a reducing atmosphere (e.g., hydrogen, nitrogen, argon, helium, carbon dioxide, a hydrocarbon, combinations thereof, or the like) to further reduce the metallic precursor via a second reduction reaction. For example, the second heat treatment may be at a temperature between about 450° C. and about 1200° C. As one example, $MoO_3$ may be heat-treated at about 450° C. to about 750° C. in a reducing atmosphere to further reduce the $MoO_3$ to $MoO_2$.

After the second reduction reaction, the heat-treating of first coating material 42 and the precursor (74) may further include heat-treating first coating material 42 and the metallic precursor at a temperature between about 450° C. and about 1200° C. in a reducing atmosphere to further reduce the metallic precursor to a substantially pure metal via a third reduction reaction. For example, $MoO_2$ may be heated at a temperature between about 900° C. and about 1200° C. in a in a hydrogen containing environment with a hydrogen partial pressure between about 0.05 and about 0.5 to further reduce the $MoO_2$ to a substantially pure Mo metal.

As another example, in examples in which the precursor includes a metallic precursor solution, heat-treating first coating material 42 and the precursor may include heat-treating first coating material 42 and the precursor at about 450° C. to about 1200° C. in a reducing atmosphere to reduce the $(NH_4)_2Mo_2O_7$, $(NH_4)_6Mo_7O_{24}.4H_2O$, $(NH_4)_2 MoO_4$, or $(NH_4)_{10}(H_2W_{12}O_{42}).4H_2O$ to Mo metal or W metal, respectively.

In some examples in which the precursor includes a metal alkoxide solution, heat-treating first coating material 42 and the precursor (74) may include, after mixing first coating material 42 and the metal alkoxide solution, polymerizing the metal alkoxide solution to form a sol. Polymerizing the metal alkoxide solution to form a sol may include, for example, partial or complete hydrolysis of the metal alkoxide on surface 44 of first coating material 42 (e.g., via the Stober reaction, or like reactions). After polymerizing the metal alkoxide solution, the technique may include converting the sol to a plurality of ceramic particles by at least partially precipitating the sol or gelling the sol. Precipitating or gelling the sol may include, for example, allowing the colloid to settle on surface 44 of first coating material particles 42, drying first coating material 42 and the sol under ambient conditions to remove at least a portion of the solvent, and/or heat-treating first coating material 42 and the sol at a suitable temperature in a suitable atmosphere to remove at least a portion of the solvent. After precipitating or gelling the sol, heat-treating first coating material 42 and the precursor (74) also may include heat treating the first coating material 42 and precipitated sol-gel at a suitable temperature in a suitable atmosphere to remove substantially all of the solvent to remove any residual solvent.

The technique of FIG. 6 optionally may include repeating the steps of mixing the first coating material 52 and the precursor and, after mixing, heat-treating the first coating material and the precursor.

Various examples have been described. These and other examples are within the scope of the following claims.

What is claimed is:

1. A method comprising:
combining a first coating material comprising a plurality of first particles and a second coating material that is different from the first coating material, wherein the first coating material comprises at least one of silicon carbide or silicon nitride, and wherein the second coating material comprises a pre-ceramic polymer precursor comprising at least one of a silicon carbide based ceramic or a silicon nitride based ceramic;
blending the first coating material and the second coating material;
heat-treating the first coating material and the second coating material at between about 450° C. and about 1400° C. to convert the pre-ceramic polymer precursor to a ceramic that at least partially encapsulates respective surfaces of the plurality of first particles to form a composite feedstock;
introducing, to a heated plume of a thermal spray gun, the composite feedstock
directing, using the heated plume, at least the first coating material to a surface of a ceramic matrix composite (CMC) substrate to deposit an impurity barrier layer comprising at least the first coating material; and
forming on the impurity barrier layer an overlying layer, wherein the impurity barrier layer is configured to reduce migration of an impurity from the CMC substrate into the overlying layer.

2. The method of claim 1, wherein an average particle diameter of the plurality of first particles is between about 0.1 micrometers and about 25 micrometers.

3. The method of claim 1, wherein the thermal spraying process comprises at least one of air or inert gas shrouded plasma spraying, high velocity oxy-fuel (HVOF) spraying, detonation spraying, solution or suspension plasma spraying, or low vapor plasma spraying.

4. The method of claim 1, wherein the thickness of the impurity barrier layer is between about 50.8 microns and about 762 microns.

5. The method of claim 1, wherein the overlying layer comprises a bond coat, the method further comprising applying an environmental barrier coating (EBC) on the bond coat, wherein the impurity barrier layer reduces migration of the impurity from the CMC substrate into the bond coat and the EBC.

6. The method of claim 1, wherein the overlaying layer comprises at least one of a bond coat, an environmental barrier coating, or a thermal barrier coating.

7. The method of claim 1, wherein the pre-ceramic polymer comprises a polycarbosilane or a polysilazane.

* * * * *